Dec. 12, 1967  L. N. NELSON  3,357,092
METHOD OF MAKING A PLASTIC SINK MOLD
Filed Feb. 4, 1963  3 Sheets-Sheet 1
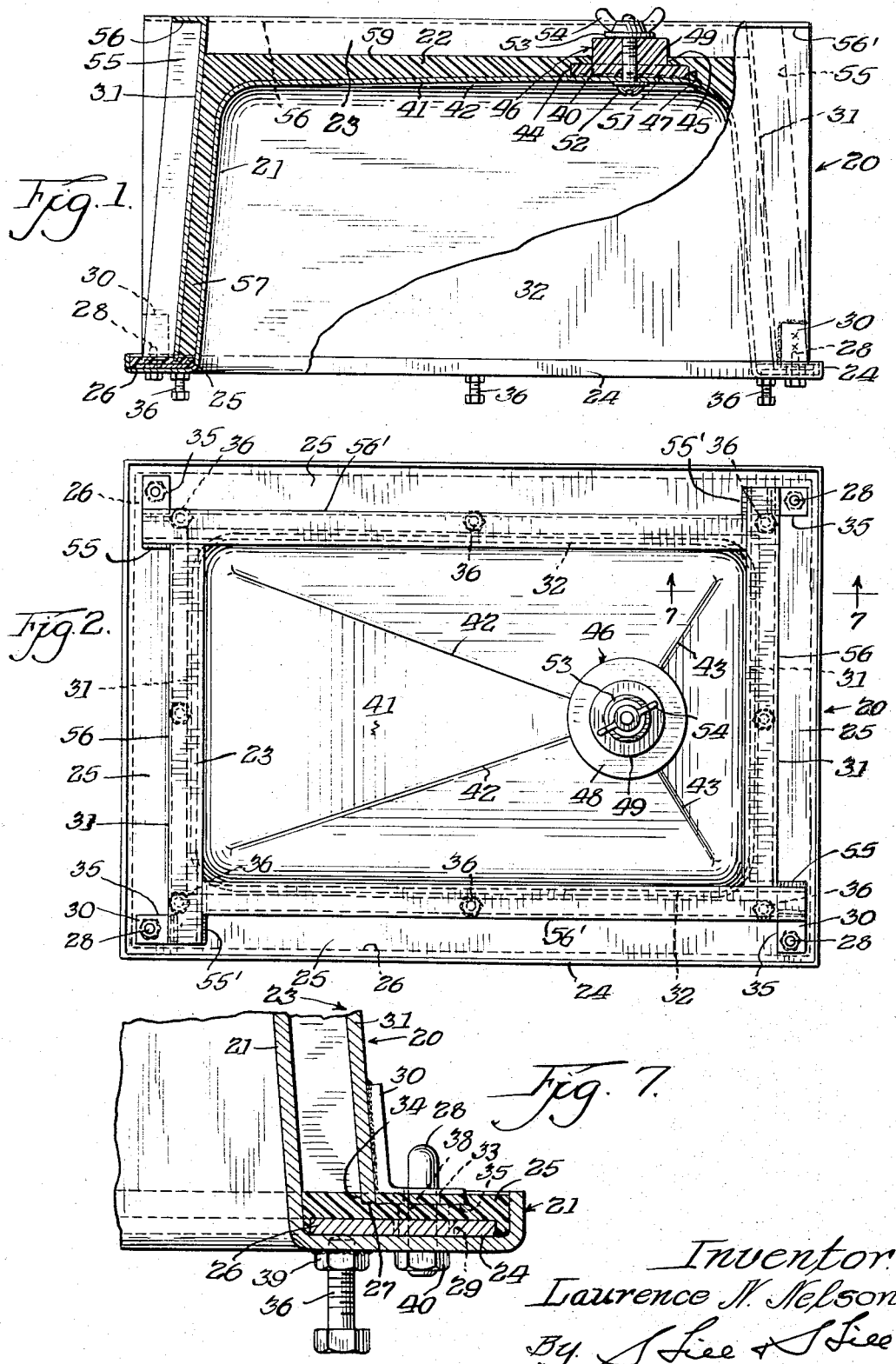
Inventor.
Laurence N. Nelson.
By S Lee & S Lee
Attys.

Dec. 12, 1967    L. N. NELSON    3,357,092
METHOD OF MAKING A PLASTIC SINK MOLD
Filed Feb. 4, 1963    3 Sheets-Sheet 2
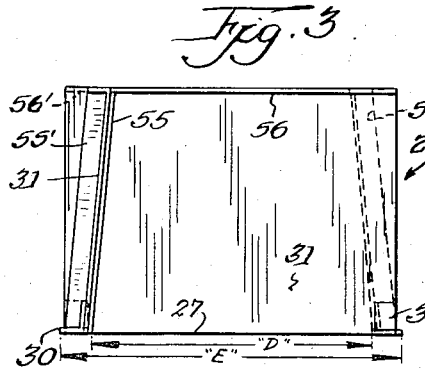
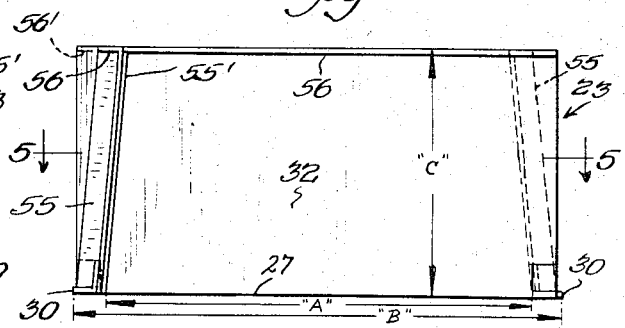
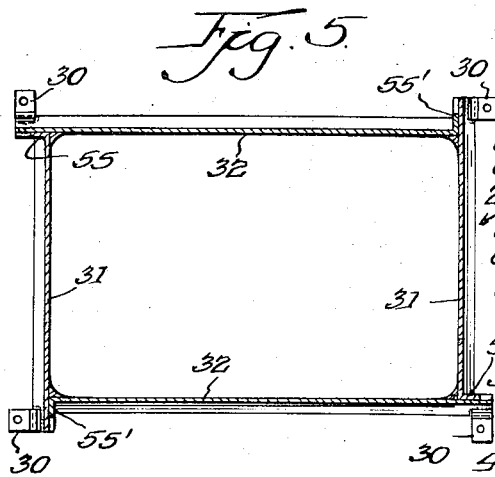
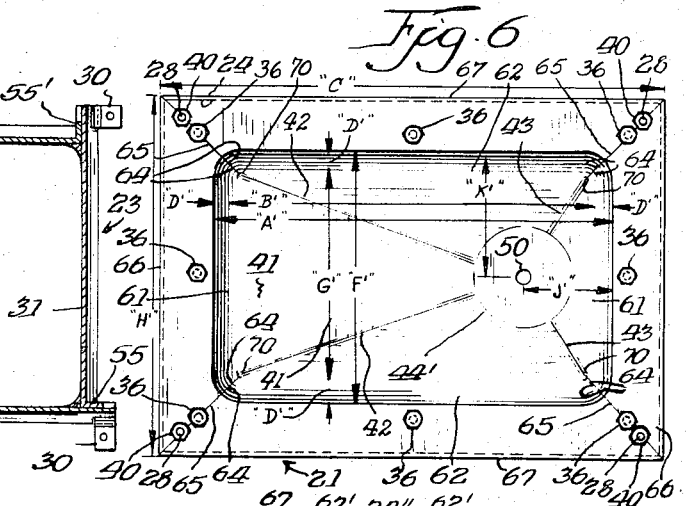
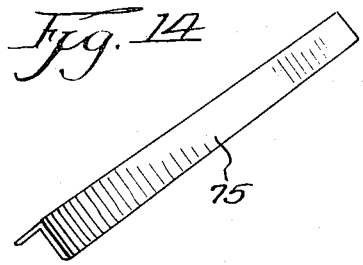
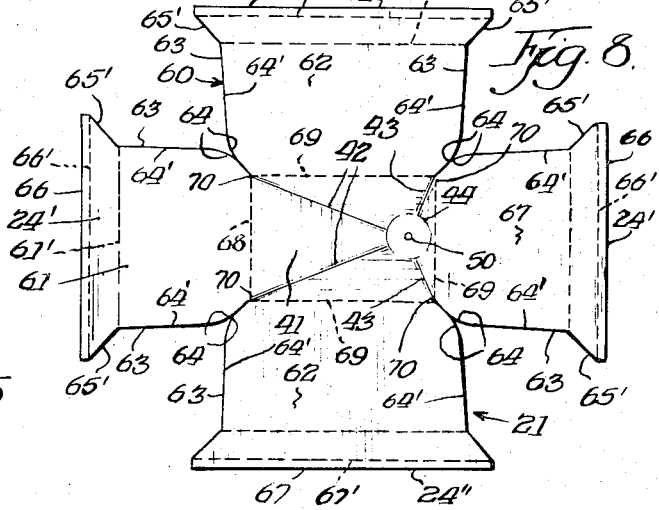
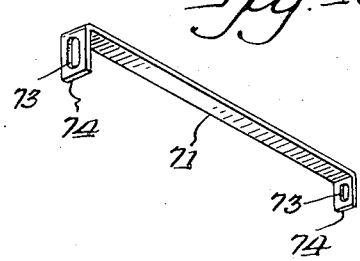
Inventor:
Laurence N. Nelson.
By Lee & Lee
Att'ys

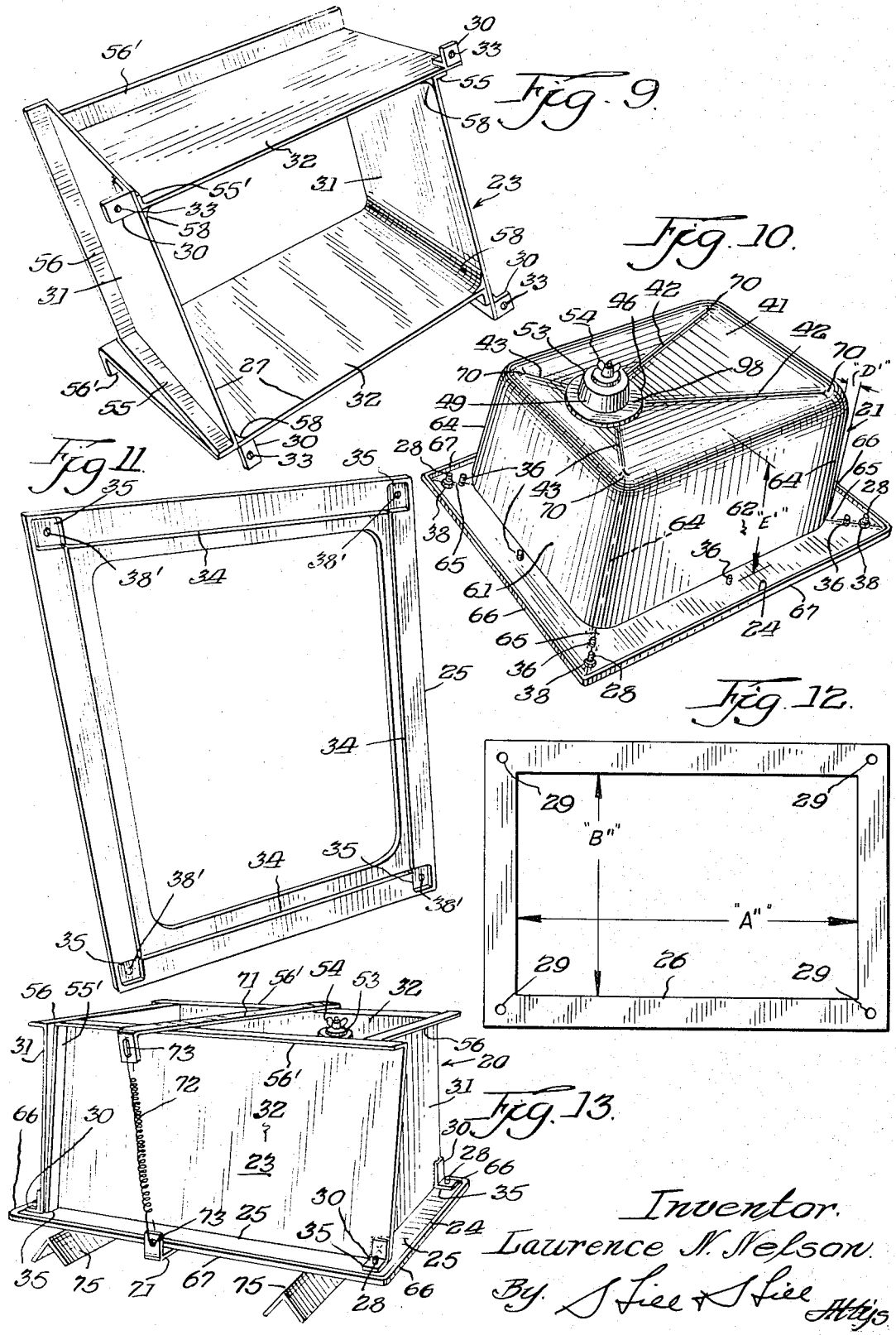

United States Patent Office 3,357,092
Patented Dec. 12, 1967

3,357,092
METHOD OF MAKING A PLASTIC SINK MOLD
Laurence N. Nelson, Adrian, Mich., assignor to Kewaunee Manufacturing Company, Adrian, Mich., a corporation of Michigan
Filed Feb. 4, 1963, Ser. No. 255,810
7 Claims. (Cl. 29—476)

This invention relates to molds and/or mold apparatus for hollow plastic casting such as an open-ended receptacle or the like, such as plastic sinks. More specifically this invention relates to an improved plastic sink mold in which the resultant plastic sink can be quickly and easily released from the mold after it has been poured and the material set and become rigid.

Prior to my invention, plastic sinks of this type were molded in machine cast aluminum molds and suitably formed for curing the material of the mold with suitable heating fluid introduced by one or more conduits to the heating passages of the mold. With molds formed from aluminum castings it has also been difficult to strip the plastic sinks from these molds. Also, molds of this type have been exceedingly expensive especially as a separate mold is required for each type and size of plastic sink.

Although with may invention, a suitable mold apparatus is required for each type and size of plastic sink, the cost of the sink molds is materially reduced.

It is therefore a principal object of my invention to provide a mold for hollow plastic casting an open-ended receptacle or the like, particularly a plastic sink which effects the expeditious release of the resultant hollow casting and/or plastic sink from the mold therefor, and wherein the mold apparatus may be used within bake ovens for the jelling of the thermoplastic material of the hollow plastic casting and the like until it is rigid so that it may be removed from the mold prior to subsequent curing of the hollow plastic casting.

A further object of the invention is to provide an improved interior and exterior mold which provides for forming a gasket for sealing the exterior mold with respect to the interior mold for the casting of the thermosetting plastic material of the resultant open-ended receptacle and/or plastic sink, and wherein the exterior mold and resultant cast open-ended receptacle and exterior mold may be removed without disturbing the interior mold.

A still further object of the invention is to provide a mold apparatus of simple, strong, durable and inexpensive construction, which may be readily fabricated from sheet metal.

Another object of the invention is to provide a novel method for fabricating an interior mold from sheet metal for hollow casting an open-ended receptacle particularly a plastic sink.

A still further object of the invention is to provide a novel method for fabricating an exterior mold complementally formed to an interior mold from fabricated sheet metal parts.

A still further object of the invention is to provide a novel method of forming a gasket and the resultant gasket in the assembled position of an exterior mold with respect to its complementally formed inner mold, the resultant gasket providing a seal for the interior and exterior molds and wherein the resultant gasket is indexed for successive use as is the exterior mold.

Other objects, features and advantages will be apparent from the following description read in conjunction with the accompanying drawings in which certain embodiments of the invention are illustrated by way of examples and the like or similar reference characters indicate similar parts.

In the drawings:

FIG. 1 is a vertical view in elevation, partly in section, illustrating a sink mold of my invention, with the cast plastic sink therein prior to stripping of the mold;

FIG. 2 is a plan view of the sink mold of FIG. 1, but without the cast sink in place to show the top of the interior mold being cross-broke to the location of the sink drain for sloping the sink bottom of the drain, and illustrating the silicone rubber plug for forming the sink plug indent;

FIG. 3 is an end elevational view of the exterior mold of the sink mold;

FIG. 4 is a front elevational view of the exterior sink mold;

FIG. 5 is a horizontal sectional view of the sink mold, taken along lines 5—5 of FIG. 4 and looking in the direction of the arrow;

FIG. 6 is a bottom view of the interior sink mold of FIG. 1 illustrating the locating pins for the gasket and exterior sink mold and the jacking screws for stripping the cast plastic sink and exterior mold from the interior mold;

FIG. 7 is an enlarged sectional view taken along lines 7—7 of FIG. 2 illustrating the gasket seal for the interior and exterior molds as illustrated in FIG. 1 and FIG. 2, a locating pin for the gasket and exterior mold and one of the jacking screws for stripping the cast plastic sink;

FIG. 8 is a plan view of a blank for fabricating an interior sink mold including the cross-broke for the location of the sink drain in the top of the interior female sink mold, the sides thereof and the portions forming the channel for the gasket seal;

FIG. 9 is a perspective view of the exterior mold removed from the interior mold looking at the bottom of the exterior mold toward an outside corner and an inside corner;

FIG. 10 is a perspective view of the interior sink mold with the exterior sink mold of FIG. 9 removed and illustrating the top of the interior mold being cross-broke to the location of the sink drain position for sloping the sink bottom of the drain and the detachable silicone rubber plug for making a sink plug indent at the location of the sink drain, the channel of the interior mold with the gasket detached and illustrating the locating pins for the gasket and the exterior sink mold with the jacking screws in the raised position for detaching the gasket;

FIG. 11 is a perspective view of the gasket means removed from the channel of the interior mold of FIG. 10 illustrating the groove complementally formed to the peripheral bottom edge of the exterior mold of FIG. 9, and also illustrating the indentations formed by the corner angles of the exterior mold for locating the exterior mold on the locating pins of the interior mold;

FIG. 12 is a plan view of the intermediate ring which is encapsulated within the gasket seal as illustrated in FIG. 1 and FIG. 7, and illustrating the indexing holes for the locating pins;

FIG. 13 is a perspective view of a mold apparatus for a hollow plastic casting such as an open-ended receptacle as a plastic sink illustrating the exterior mold and gasket assembled on the interior mold and clamped in position by clamp bars and springs and supported on angles for supporting the mold above the jacking screws and for positioning on a pallet during the casting and also in baking of the the cast sink while within the mold;

FIG. 14 is a perspective view of one of the angles of FIG. 13 for supporting the mold on a pallet; and FIG. 15 is a perspective view of one of the clamp bars as illustrated in FIG. 13 for clamping the parts of the mold apparatus together.

In order to accomplish the various objects of my invention, I have provided as one embodiment of my old apparatus for hollow plastic casting an open-ended receptacle or the like such as a plastic sink, an interior mold formed as a female mold for providing the interior profile of the hollow plastic casting, an exterior mold complementally formed for providing the exterior peripheral profile of the hollow plastic casting and spaced from the female mold to provide for the peripheral thickness of the hollow plastic casting, said exterior mold being substantially frusto-conical and/or a frustum of a pyramid in configuration. The female mold includes a channel at the bottom peripheral edge thereof and the channel is adapted for pouring a gasket for sealing the interior and exterior molds together. The gasket also includes an annular intermediate ring complementally formed for reception in the channel and to the outer lower peripheral edge of the interior mold locating pins are affixed at the corners of the channel and complementally formed for indexing, and clearance holes are provided at the diagonal corners of the intermediate ring for indexing the gasket. The exterior mold includes corner brackets provided with holes, complementally formed to the locating pins for indexing the exterior mold with respect to the interior mold. The intermediate ring of the gasket is completely encapsulated with silicone rubber, and the peripheral edge of the exterior mold and the corner brackets complementally formed to a peripheral groove, and indentations for the brackets within the silicone rubber of the gasket provided that the gasket forming the seal between the interior and exterior molds may be successively used in molding hollow plastic castings. Jacking screw means are complementally threaded within the channel about the periphery of the interior mold and within the periphery of the center lines between the locating pins. Certain of said jacking screw means are contiguous to the locating pins and other of said jacking screw means are intermediate the aforesaid certain of said jacking screw means. The jacking screw means are operatively mounted for engaging the intermediate ring of the gasket means for exerting upward pressure on the gasket means and for forcing the hollow plastic casting and/or the exterior mold apart vertically with respect to the interior mold and the channel thereof, the tapered configuration of the interior mold and casting permitting effective separation through a relatively short movement of the jacking screw means, and the tapered peripheral configuration of the exterior mold and casting permitting effective separation of the exterior mold from the outer peripheral surface of the casting. The top of the interior mold is cross-broke to the location of the sink drain position for sloping the sink bottom of the drain. A silicone rubber plug for making a sink plug indent is detachably mounted upon the top of the interior mold at the location for the sink drain, and the rubber plug includes co-axial members one of which forms the annular recess for mounting the sink drain and the other forms an opening through the bottom of the sink.

Referring more particularly to the figures of the drawings, an improved molding apparatus 20 comprising an interior and/or inner mold 21 formed as a female mold for providing the interior profile of a hollow plastic casting 22 cast within the mold apparatus. An exterior mold 23 is complementally formed for providing the exterior peripheral profile of the hollow plastic casting 22. The exterior mold and interior mold are preferably in the form of a frustum of a pyramid in configuration, although it is within the scope of the invention that the exterior and interior molds may also be frusto-conical in configuration for pouring a frusto-conical hollow plastic casting in the form of an open-ended receptacle such as a frusto-conical sink or as an open-ended receptacle or the like such as a plastic sink preferably in the form of a frustum of a pyramid in configuration. The female mold 21 is formed with a channel 24 at the bottom peripheral edge of the female mold. The channel 24 is adapted for pouring a gasket means and/or gasket 25 for sealing the interior and exterior molds together. The gasket comprises an annular intermediate ring 26 complementally formed for reception in the channel 24 and to the outer lower peripheral edge 27 of the interior mold 21.

Locating pins 28 are affixed at the corners of the channel 24 and complementally formed for indexing, and clearance holes 29 are provided at the diagonal corners of the intermediate ring 26 for indexing the gasket 25.

The exterior mold 23 is provided with corner brackets 30 formed from angle stock formed as illustrated in FIGS. 1, 2, 3, 4 and 7 and suitably welded or riveted to the respective corners of the respective oppositely formed symmetrical sides 31 forming the width of the exterior mold, and the complementally and symmetrically formed sides 32 forming the length of the exterior mold 23. The corner brackets 30 are provided with holes 33, FIGS. 7 and 9, complementally formed to the locating pins 28 for indexing the exterior mold 23 with respect to the interior mold 21.

The intermediate ring 26 of the gasket 25 is completely encapsulated with silicone rubber. The peripheral edge 27 of the exterior mold 23 and the corner brackets 30 thereof are complementally formed to a peripheral groove 34 and the indentations 35 for the corner brackets 30 within the silicone rubber of the gasket 25 so that the gasket 25 forming the seal between the interior mold 21 and exterior mold 23 may be successively used in molding hollow plastic castings in the form of a plastic sink 22, FIG. 1. Jacking screw means 36 of such a length as will completely strip the gasket means 25 from its complementally formed channel 24 and the hollow plastic casting 22 from the interior mold such that it is free from the peripheral surface of the interior mold and may be readily removed manually from the inner mold. The jacking screws 36 are preferably located as illustrated in FIGS. 1, 2, 6 and 10 and within the periphery of the center lines between the locating pins 28 at the diagonal corners of the channel as shown in FIGS. 1, 2, 6, 7 and 10. Referring to FIG. 7, the locating pin portion of the locating pin 28 extends through a clearance hole 33 in the corner bracket 31 and the hex portion 38 extends through a complementally formed hexagonal opening 38' of the gasket 25 and also through the clearance hole 29 of the intermediate ring 26. To increase the complementally formed thread for the jacking screws 36, hexagonal nuts 39 may be welded in place as shown. The locating pins 28 are affixed in position by locking nuts 40. The hex heads on the jacking screw means 36 permit the use of open-end wrenches or ratchet wrenches for adjusting the jack screws from their lowermost to their uppermost range through a distance sufficient to strip the cast hollow receptacle from the interior mold. With the construction of the jacking screw means as described they are operatively mounted for engaging the intermediate ring 26 for exerting upward pressure on the gasket means and for forcing the hollow plastic casting and/or the exterior mold 23 apart vertically with respect to the interior mold 21 and the channel 25 thereof; the tapered configuration of the interior mold 21 and casting 22 permitting effective separation through a relatively short movement of the jacking screw means 36, and the tapered peripheral configuration of the exterior mold 23 and the casting 22 permitting effective separation of the exterior mold 23 from the outer peripheral surface of the casting 22.

Referring to FIGS. 1, 2, 6, 10, 16 and 17, the top 41 of the interior mold 21 is cross-broke along diagonals 42 and the short diagonals 43 to the location of the sink drain position 44, FIG. 1, in the plastic sink 22 and 44', FIG. 6 and FIG. 8 of the interior mold for sloping the sink bottom to the drain 45. A silicone rubber plug 46 for making the sink plug indent 47, FIG. 1, is detachably mounted upon the top 41 of the interior mold 21 at the location for the sink drain, the silicone rubber plug 46 including co-axial members 48 and 49, the cylindrical member 48 forming the annular recess 47 for mounting the sink drain and the other cylindrical member 49 forms an opening 45 through the bottom of the sink 22.

For detachably affixing the silicone rubber plug 46 to the top 41 of the interior mold 21, a hole 50 is punched in the center of the sink drain position 44' at the intersection of the diagonal drain grooves 42 and 43, as fabricated in the blank of FIG. 8 and the position of the interior mold of FIG. 6. Although in the embodiment of the invention as illustrated, the sink plug indent 47, FIG. 1, is shown offset with respect to the longitudinal axis of the sink, it is within the scope of the invention that the location of the sink plug indent and the drain grooves of the cast sink may be located in the center of the sink or any other preferred location without departing from the scope of the invention. The silicone rubber plug 46 formed as described may have a concave surface 51 formed on the cylindrical member 48, FIG. 1, so that when the silicone rubber plug is assembled in position as illustrated and clamped in position by a stove bolt 52 assembled through a washer on the underneath side of the interior mold and extending through the silicone rubber plug where it is secured in place by a washer 53 and wing nut 54. As the silicone rubber plug is secured in position, the concave surface 51 permits the silicone rubber plug to conform to the contour of the interior mold at the sink drain position 44. When the sink is cast, the silicone rubber plug forms the indent for the eventual installation of a sink plug drain. Thus, by varying the size of this silicone rubber plug, indents for various sizes and designs of sink plugs can be made from the same basic sink mold.

Referring to FIGS. 1, 2, 3, 4, 5, 9, 13 and 17, there will be described the preferred form of exterior mold 23 of my invention and the method of fabricating. The method of fabricating an exterior mold 23 complementally formed to the interior mold 21 of a mold for hollow casting an open-ended receptacle such as a plastic sink 22 preferably comprises fabricating opposite pairs 31 and 32 of similarly formed sides from sheet metal preferably from 12 gage cold rolled steel which may be bonderized to correspond with the predetermined size of the open-ended receptacle 22. A vertical side edge of each of said sides is formed with an angular stiffening member 55 for the short sides 31 and 55' for the longer sides 32, the angle of which permits the contiguous sides to abut against the outer face of the stiffening member in the assembled position of the sides 31 and 32 as they are arranged in welding position. An angular stiffening member 56 is formed at the upper edge of the short side members 31, and a similar stiffening member 56' is formed at the upper edge of the long side members 32, so that in the assembled position of the side members 31 and 32 to form the exterior mold 23, a substantially annular stiffening frame is formed for the assembled sides of the exterior mold 23. The sides 31 and 32 of the exterior mold 23 are spaced from the interior mold 21 therefor to provide the thickness of the walls of the hollow casting 22 by using spacers (not shown) corresponding to the thickness of the sink wall required. In a sink of this type, the preferred thickness for the side walls is ½", although it is within the scope of the invention that other side wall thicknesses may be used depending upon the use to which the open-ended receptacle or plastic sink is to be used. The four sides of the exterior mold are welded together with the sides in clamped position against the respective spacers therefor so that a ring with an interior profile the shape of the exterior of the open-ended receptacle or plastic sink is formed. The four sides are overlapped as shown, e.g., in FIGS. 2, 3, 4, 5, 9 and 17 at the corners and welded to the contiguous sides along the edge of the stiffening members 55 and 55' to the abutting face of the respective contiguous side members. Similarly the stiffening members 56 and 56' may be welded together to complete the annular stiffening frame at the upper edge of the exterior mold. It is preferred that after the sides of the exterior mold are welded and while still clamped in position, the position of the locating pins 28 of the interior mold channel 24 is marked with relation to the corner angles 30 welded to the bottom corners of the outside mold 23 so that the exterior mold 23 is indexed with respect to the interior mold 21 for successive use of the assembled exterior mold 23 with the interior mold 21 in forming a gasket means 25 for sealing the respective molds 21 and 23 together when assembled for hollow casting an open-ended receptacle 22.

In the fabrication of the exterior mold, as described above, the plastic sink as made from the mold 20 will have the correct thickness of walls 57 for the short sides of the sink and 57' for the long sides of the sink, even though the dimensions of the interior mold vary slightly. This is important since in the fabrication of sheet metal, it is difficult and therefore expensive to maintain exact dimensions. The above procedure allows the two side pieces 31 and 32 to be made cheaply and then fitted together after fabrication to maintain the wall thickness of the sink. In order to complete the interior periphery of the exterior mold 23, corner fillets 58, FIGS. 9 and 17, are affixed at the juncture of the sides 31 and 32 so that sharp corners are not formed on the resultant plastic sink cast thereagainst. The letters A through H, J and K in FIGS. 3, 4, 6 and 10 designate the pertinent dimensions entering into the fabrication of the mold and it will be appreciated that the invention enables a maintenance of desired dimensions in a simple and reliable manner. A typical exterior mold 23, formed in this manner, preferably has the stiffening members 55, 55' for the vertical edges and 56, 56' for the horizontal edges substantially 1" in width. Referring to FIG. 3 which is the end elevation of the exterior mold 23, a typical dimension with respect to the interior of the mold may be identified by D and the overall bottom length by E. Referring to the front elevation of the exterior mold 23 of FIG. 4, the bottom length of the interior of the mold identified by A, and the overall length of the bottom edge of the mold by B. A particular exterior mold will have the dimensions A 15 3/16", B 17 5/16", C 8", D 11 1/8", E 13 1/4". A larger size exterior mold may have the following dimensions: A 25 5/16", B 27 7/16", C 10 1/8", and D 17 17/32" and E 19 11/32". C indicates the height of the exterior mold 23 in the side or end elevation of FIG. 3 and the front elevation of FIG. 4. It is to be understood that it is within the scope of the invention that various changes in these dimensions may be made for fabricating various sizes of exterior molds for the manufacture of corresponding plastic sinks or open-ended receptacles as cast therefrom.

Referring to FIGS. 1, 2, 6, 10 and 16, the dimensions of an interior mold 21 corresponding to the exterior mold 23 as set out above, wherein the channel is substantially 2" in width with a height of ½" and wherein the overall length is indicated by C', the top length by B', and the taper on each side by D' with A' indicating the sum of two D' and B'.

Referring to FIG. 12, the annular intermediate ring or release collar 26 may be formed from a single blank though preferably from single pieces welded together to fit down over the interior mold 21 and into the channel formation 24, and the clearance holes 29 placed in each corner so that the ring will fit down over the locating pin 28 and the hexagonal portion 38 thereof and rest on the bottom of the channel 24. The parts of the mold are so indexed that in subsequent reassembly they will be correctly located the same as during fabrication.

Referring to FIGS. 6, 8 and 10, there will be described the novel method for fabricating an interior mold 23 from a single sheet blank 60, FIG. 8, which forms the complete interior mold 23. The sheet metal blank 60 is notched in shape as shown in FIG. 8 to provide the top 41, the opposite ends 61 and the opposite sides 62 which compare respectively to the ends 31 and sides 32 of the exterior mold 23. Each edge of the ends and sides 61 and 62 is formed as 63 with a curved portion 64 to form the curved upper edge of the interior mold as shown in the interior view of the interior mold 21 of FIG. 6, and the exterior view thereof as shown in FIG. 10. The draft of the interior mold corresponding to that of the exterior mold is formed by the tapered edges 64'. The diagonal seam 65 of each corner of the channel 24 is provided by the diagonal edge 65' of the blank as illustrated in FIG. 8. The vertical side edges 66 and 67 of the channel 24 are formed about the dotted lines 66' and 67', and the channel is formed about the respective sides 61 and 62 along the dotted lines 61' and 62' which are at the bottom edge of the interior mold 21. In forming the blank of FIG. 8, it is bent, e.g., to the shape of FIG. 6 and also about the dotted lines 68 and 69 for shaping the curved portion of the interior mold contiguous to the top 41 thereof and the respective sides 61 and 62. The respective edges as formed are then suitably welded together, forming the welded juncture at the tapered edge 64' and the curved portion 64 thereof as well as the diagonal seam 65 of the channel and the vertical junction thereof of the edges of the channel. It may be necessary to suitably notch the blank and weld at 70 to complete the curved corners at the juncture of the upper portions of the sides of the interior mold. After the interior mold is suitably welded along the joints thereof as described with reference to FIGS. 6 and 8, the welded joints are very carefully ground to form a smooth curved corner as illustrated in the interior of the interior mold of FIG. 6 and the exterior thereof of FIG. 10 so that the sink as cast thereagainst will have smooth corner arcuate joints, both at the sides and at the bottom edges of the sink. The long diagonal grooves 42 and short diagonal grooves 43, to provide that the top of the interior mold is cross-broke to the location of the sink drain position for sloping the sink bottom to the drain, may be formed by suitably pressing in the grooves of the mold to form a complementally formed groove in the bottom of the sink while the interior mold blank is still in the form as illustrated in FIG. 8. It is also within the scope of the invention that these grooves forming the drainage for the bottom of the sink may also be located where desired.

Referring to FIGS. 1, 7, 9, 10, 11, 12 and 13, there will be described the method of making the gasket means or gasket 25 for sealing the peripheral edge of the exterior mold 23 to the interior mold 21. The parts thereof are thoroughly cleaned and the jacking screws 36 are adjusted to be flush with the metal surface of the bottom of the channel 24. The interior mold 21 is then leveled and all surfaces of the channel 24 are coated with wax. The bottom peripheral edge 27 of the exterior mold 23 is also coated with wax. The intermediate ring 26 is given a coating of a special primer to improve the bond of the silicone rubber forming the gasket seal. A special room temperature vulcanizing (RTV) silicone rubber is then mixed and a vacuum pulled on it to remove the bubbles, and a sufficient quantity of the silicone rubber is poured into the channel 24 on the interior mold to almost fill the channel 24. The intermediate ring 26 is now set in place and allowed to settle into the liquid rubber to become completely encapsulated in the silicone rubber. It is also preferred to use (RTV) silicone rubber primer with the special room temperature vulcanizing silicone rubber.

The exterior mold 23 is then set in place on the locating pins 28, FIGS. 7 and 10 and supported upon the hexagonal portions 38 of the locating pins, which will allow the bottom edge 27 of the exterior mold to set into the liquid silicone rubber a slight distance. The silicone rubber is then allowed to cure. After curing is complete, the exterior mold 23 is lifted off the interior mold 21 and the gasket seal 25 is removed from the channel 24 at the bottom of the interior mold. The wax coating acts as a parting agent to facilitate stripping the molds from the intermediate ring. Referring to FIGS. 9, 10 and 11, the exterior mold 23 is shown detached from the interior mold 21 (FIG. 10) after which the gasket 25 has been removed. The silicone rubber plug 46 may also be formed from a similar and complementally formed mold to the peripheral surface of the rubber plug 46 and provided with a hole to receive the securing means in the form of a stove bolt 52. The silicone rubber plug 46 may also be formed into any predetermined form of plug to provide the necessary sink plug indent for the particular form of sink being molded.

After the molding of the gasket means 25 upon detachment of the parts of the mold, the interior mold 21 and the exterior mold 23 are now cleaned thoroughly to remove all traces of the wax, and all surfaces to the inside of the mold cavity are given an etch with a commercial metal prepmaterial. The surfaces are then sprayed with silicone varnish and the varnish cured by baking at a suitable recommended temperature and time. In practice it has been found that the life of the silicone varnish parting agent is prolonged many times by mixing a small quantity of flake graphite into the varnish before spraying and then lubricating the surfaces with a silicone grease prior to each use.

Referring to FIGS. 9, 10 and 11, after the surfaces of the mold have been suitably coated with the parting agent, the gasket 25 is assembled, the groove 34 having been formed by the method of making the gasket 25 as described above and is suitably indexed upon the hexagonal portions 38 of the locating index pins 28. After the gasket 25 is placed, the exterior mold 23 is suitably indexed in place within the peripheral groove 34 and the corner brackets 30 are suitably indexed in their respective indentations 35. The silicone rubber plug 46 may either be assembled preferably as in FIG. 10 without the gasket 25 in place or the exterior mold in place although it is within the scope of the invention that the silicone rubber plug may be suitably assembled in any manner as long as it may be detachable to permit stripping of the mold and the open-ended receptacle cast within the assembled mold. The rubber plug 46 for making the sink plug indent 47 is then bolted to the interior mold 21 and the gasket seal 25 replaced. The outside mold 23 is placed in position and the assembly clamped together as illustrated in FIG. 13 using clamping members 71 across the upper edge of the exterior mold and across the bottom of the interior mold as shown in FIG. 13 which are held in clamped position by tension springs 72 affixed to holes 73 in opposite ends 74 of the clamping means 71, FIGS. 13 and 15. The entire assembled mold 20 is then set in place, using two angles 75, FIGS. 13 and 14, as spacers to clear the jacking screws 36 underneath the interior mold 21, the spacer angles being positioned on a pallet (not shown) so that the entire mold will remain level during casting and while being baked after the open-ended receptacle has been poured and set.

In casting a plastic sink within the particular mold of my invention, it is preferred to use a modified "epoxy" resin with a suitable filler, and prior to pouring the material of the plastic sink in place, it is preferred to suitably preheat. After the material of the plastic sink has been poured it is permitted to jell by heating in a suitable oven until the plastic molded sink becomes rigid. After the plastic sink has become rigid, it is preferred to remove it from the oven and to strip the exterior mold and the molded plastic sink from the interior mold. This is accomplished by raising the jacking screws to the point that the inner peripheral surface of the plastic sink is stripped from the interior mold. Since material of the molded plastic sink has a tendency to shrink, the exterior mold may be readily detached, after which the rigid plastic sink may be detached from the interior mold whereupon it may be further cured within a suitable batch oven.

Although the invention has been particularly described with reference to the fabricating of a plastic sink, it is within the scope of the invention that other forms of open-ended receptacles and/or other shapes may be fabricated in the same manner within the scope of the invention.

Having thus described my invention, it is obvious that various immaterial modifications may be made in the same without departing from the spirit of my invention; hence, I do not wish to be understood as limiting myself to the exact form, construction, arrangement and combination of parts herein shown and described, or uses mentioned.

What I claim as new and desire to secure by Letters Patent is:

1. A method of fabricating a mold for hollow casting an open-ended receptacle or the like, which comprises the following steps: fabricating an interior mold from a single sheet metal blank which forms the complete interior mold, said sheet metal blank notched and shaped so that when formed includes the interior surface of the hollow casting with a peripheral channel integrally formed therewith, and welding the seams of the contiguous sides of the interior mold forming an interior mold in the shape of a frustum of a pyramid and the channel at the lower peripheral edge of the sides of the interior mold, welding the diagonal seams of the contiguous sides of the mold and the contiguous corresponding portions of the channel so that a peripheral channel is integrally formed with the sides of the interior mold at the bottom edge thereof, assembling locating pins for detachably mounting a complementally formed exterior mold thereto, said sides of the exterior mold being spaced from the interior mold to provide the thickness of the hollow casting, said locating pins adapted for supporting a gasket means including an annular intermediate ring complementally formed to be received in the peripheral channel, assembling jacking screws within the channel and contiguous to the juncture of the peripheral edge of the interior mold to the channel, said exterior mold in the form of an open-ended frustum of a pyramid formed by welding together the four sides of the mold to form a ring with an interior profile the shape of the exterior of the hollow casting, said four sides of the mold having the corners overlapped and fitted together around the interior mold, utilizing spacers the thickness of the wall of the hollow casting, and welding the sides of the mold together so that the hollow casting made from the mold will have the correct thickness of the walls even though the dimensions of the interior mold vary slightly, after the outside sides of the exterior mold are welded and while still clamped in position, locating the position of the locating pins in the channel of the interior mold which are assembled with relation to corner angles welded to the bottom corners of the exterior mold, said intermediate ring formed to fit over the interior mold and into the channel formation and provided with clearance holes in each corner so that the intermediate ring will fit down over the locating pins and rest on the bottom of the channel, said parts indexed so that in subsequent reassembly of the parts for fabricating a hollow casting, the parts are correctly located the same as during fabrication, with the exterior mold detached from the locating pins of the interior mold, pouring a sufficient quantity of silicone rubber within the channel of the interior mold to almost fill the channel, setting the intermediate ring in place upon the locating pins and permitting the intermediate ring to settle into the silicone rubber to become completely encapsulated in the silicone rubber, setting the exterior mold in place on the locating pins which permits the bottom peripheral edge of the exterior mold to set into the silicone rubber forming a peripheral groove for the peripheral edge of the exterior mold within the silicone rubber and indentations for the respective corner brackets, permitting the silicone rubber of the gasket to cure, after curing is complete the exterior mold is lifted off the interior mold and the gasket seal is removed from the channel at the bottom of the interior mold, and said gasket permits the interior and exterior molds to be repeatedly used for molding hollow castings therefrom.

2. The method of fabricating a mold for hollow casting an open-ended receptacle or the like, which comprises the following steps: fabricating an interior mold from sheet metal stock, having locating pins, forming an exterior mold by fabricating opposite pairs of similarly formed sides from sheet metal to correspond with the predetermined size of the open-ended receptacle to be formed in the mold for hollow casting the open-ended receptacle, forming on a vertical side edge of each of said sides an angular stiffening member, the angle of which permits the contiguous side to abut against the outer face of the stiffening member in the assembled position of the sides as they are arranged in welding position, forming an angular stiffening member at the upper edge of each side member so that in the assembled position of the position of the side members to form the exterior mold a substantially annular stiffening frame is formed for the assembled sides of the exterior mold, spacing the sides of the exterior mold from said interior mold to provide the thickness of the walls of the hollow casting by using spacers corresponding to the thickness of the sink wall required, welding together the four sides of the exterior mold with the sides in clamped position against the respective spacers therefor so that a ring with an interior profile the shape of the exterior of the sink is formed, said four sides being overlapped at the corners and welded to the contiguous sides along the edge of the stiffening member to the abutting face of the contiguous side member, after the sides of the exterior mold are welded and while still clamped in position, locating the position of the locating pins of the interior mold channel with relation to corner angles welded to the bottom corners of the outside mold so that the exterior mold is indexed with respect to the interior mold, and forming a gasket in the assembled exterior and interior molds for sealing the respective molds when assembled together for hollow casting an open-ended receptacle.

3. The method of fabricating a mold for hollow casting or open ended receptacle and the like, comprising the steps of fabricating an interior mold and an exterior mold, said interior mold provided with a peripheral channel and locating pins at the diagonal corners of the channel together with jacking screws operatively mounted in the base of the peripheral channel for the gasket, said exterior mold provided with corner angles and complementally formed to the locating pins for indexing the exterior mold with respect to the interior mold, cleaning the parts of the interior mold and the exterior mold in which the gasket is to be formed against, adjusting the jacking screws flush with the surface of the channel against which the gasket is formed, leveling the interior mold, coating with wax the surfaces of the channel against which the gasket is to contact, coating the bottom edge of the exterior mold with wax, coating an intermediate ring against which the jacking screws are in operative relationship and which is located by the locating pins for indexing the gasket with a coating of a special primer for improving the bond of the silicone rubber of the gasket, mixing a room temperature vulcanizing silicone rubber and pulling a vacuum on the mixed silicone rubber to remove the bubbles, pouring a sufficient quantity of the silicone rubber into the channel of the interior mold to almost fill the channel, setting the intermediate ring in place and allowing it to settle into the liquid silicone rubber to be completely encapsulated in the silicone rubber, setting the exterior mold in place on the locating pins permitting the bottom edge of the exterior mold to set into the liquid rubber a predetermined distance, allowing the silicone rubber to cure, and after curing is complete, the exterior mold is lifted off the interior mold and the resultant gasket seal is removed from the channel at the bottom of the interior mold, the wax coating acting as a parting agent to facilitate stripping the interior and exterior molds from the intermediate ring.

4. The method of fabricating a mold as set forth in claim 3, wherein said intermediate ring is formed to fit down over the interior mold and into the channel thereof, forming clearance holes in each corner so that the intermediate ring will fit down over the locating pins and rest on the bottom of the channel, whereby in subsequent uses of the gasket the intermediate ring provides a release collar to provide a surface for the jacking screws, and after curing of the gasket the peripheral bottom edge of the exterior mold forms a complemental groove in the gasket substantially at the depth of the position of the corner brackets as positioned upon the locating pins, indentations being formed by the corner brackets within the gasket which together with the annular groove formed in the gasket by the bottom edge of the exterior mold indexes the gasket and the exterior mold with respect to the interior mold for subsequent use in casting an open-ended receptacle.

5. The method of fabricating a mold for casting a plastic sink, which comprises the following steps: fabricating an interior mold from a single sheet metal blank which forms the complete interior mold, said sheet metal blank notched in shape so that when formed includes the interior surface of the sink with a peripheral channel integrally formed therewith, and welding the seams of the contiguous sides of the interior mold forming an interior mold in the shape of a frustum of a pyramid and the channel at the lower peripheral edge of the sides of the interior mold, welding the diagonal seams of the contiguous sides of the mold and the contiguous corresponding portions of the channel so that a peripheral channel is integrally formed with the sides of the interior mold at the bottom edge thereof, assembling locating pins for detachably mounting a complementally formed exterior mold thereto, said sides of the exterior mold being spaced from the interior mold to provide the thickness of the sink, said locating pins adapted for supporting a gasket means including an annular intermediate ring complementally formed to be received in the peripheral channel, assembling jacking screws within the channel and contiguous to the juncture of the peripheral edge of the interior mold of the channel, said exterior mold in the form of an open-ended frustum of a pyramid formed by welding together the four sides of the mold to form a ring with an interior profile the shape of the exterior of the sink, said four sides of the mold having the corners overlapped and fitted together around the interior mold, utilizing spacers the thickness of the wall of the sink, and welding the sides of the mold together so that the sink made from the mold will have the correct thickness of the walls even though the dimensions of the interior mold vary slightly, after the outside of the exterior mold is welded and while still clamped in position, locating the position of the locating pins in the channel of the interior mold which are assembled with relation to the corner angles welded to the bottom corners of the exterior mold, said intermediate ring formed to fit over the interior mold and into the channel formation and provided with clearance holes in each corner so that the intermediate ring will fit down over the locating pins and rest on the bottom of the channel, said parts indexed so that in subsequent reassembly of the parts for fabricating a sink, the parts are correctly located the same as during fabricating, with the exterior mold detached from the locating pins of the interior mold, pouring a sufficient quantity of silicone rubber within the channel of the interior mold to almost fill the channel, setting the intermediate ring in place upon the locating pins and permitting the intermediate ring to settle into the silicone rubber to become completely encapsulated in the silicone rubber, setting the exterior mold in place on the locating pins which permits the bottom peripheral edge of the exterior mold to set into the silicone rubber forming a peripheral groove for the peripheral edge of the exterior mold within the silicone rubber and indentations for the respective corner brackets, permitting the silicone rubber of the gasket to cure, after curing is complete the exterior mold is lifted off the interior mold and the gasket seal is removed from the channel at the bottom of the interior mold, and said gasket permits the interior and exterior molds to be repeatedly used for molding sinks therefrom.

6. The method of fabricating an interior mold as set forth in claim 5, assembling at each corner of the channel, stud means adapted to locate the exterior mold with respect to the interior mold and to serve as a spacer for pouring a gasket seal within the channel, and assembling a plurality of jacking screws within the channel and adapted to press on the underside of a gasket complementally formed within the channel so that the sink may be pushed off the interior mold.

7. The method of fabricating an interior mold as set forth in claim 5, wherein the interior mold is used for casting sinks, said interior mold to be formed as a female mold for the interior profile desired in the sink, forming the sheet metal blank which provides the top of the mold so that it is cross-broke to the location of the sink drain location to slope the sink bottom to the drain, a hole is punched in the mold at the location of the drain plug, and a silicone rubber plug is adapted to be fastened to the interior mold to form the indent for eventual installation of a sink plug drain within the indent.

References Cited
UNITED STATES PATENTS

| | | | |
|---|---|---|---|
| 2,151,568 | 3/1939 | Sinclair | 29—475 |
| 2,579,396 | 12/1951 | Philipp | 29—475 |
| 2,851,731 | 9/1958 | Gitts | 18—47.5 |
| 2,976,573 | 3/1961 | Davis | 18—47.5 |
| 1,949,072 | 2/1934 | Clarke | 18—55 |
| 2,635,294 | 4/1953 | Rolaston | 18—55 |
| 2,763,055 | 9/1956 | Hardy | 29—450 |
| 2,795,036 | 6/1957 | Haushólter | 29—450 |
| 2,675,607 | 4/1954 | Catlin | 29—526 |
| 2,932,085 | 4/1960 | Allward | 29—526 |
| 2,832,995 | 5/1958 | McCaw | 18—34 XR |
| 2,869,179 | 1/1959 | Van Hartesveldt | 18—34 XR |
| 2,395,144 | 2/1946 | Stivason | 18—45 |
| 2,769,203 | 11/1956 | Wood | 18—45 |
| 1,476,828 | 12/1923 | Moorath | 18—58 |
| 2,945,264 | 7/1960 | Reccitiello et al. | 18—58 |
| 3,071,279 | 1/1963 | Bruce | 220—1 |
| 3,100,056 | 8/1963 | Friday | 220—1 |
| 3,206,532 | 9/1965 | Nottingham et al. | 25—130 |
| 3,136,024 | 6/1964 | La Monica | 249—66 |
| 2,934,989 | 5/1960 | Belli et al. | |
| 2,894,311 | 7/1959 | Sinclair | 249—151 |
| 2,379,218 | 6/1945 | Dial et al. | 264—313 |
| 1,983,757 | 12/1934 | Hick | 264—336 |
| 1,974,794 | 9/1934 | Blickman | 4—187 |
| 1,462,640 | 7/1923 | Hoffman | 29—475 |

JOHN F. CAMPBELL, *Primary Examiner.*

J. W. STEPHENSON, *Examiner.*

J. CLINE, *Assistant Examiner.*